US012157599B2

(12) United States Patent
Bardini

(10) Patent No.: US 12,157,599 B2
(45) Date of Patent: Dec. 3, 2024

(54) CONTAINER LABELING MACHINE

(71) Applicant: P.E. LABELLERS S.P.A., Porto Mantovano (IT)

(72) Inventor: Riccardo Bardini, Torri del Benaco (IT)

(73) Assignee: P.E. Labellers S.P.A., Porto Mantovano (IT)

( * ) Notice: Subject to any disclaimer, the term of this patent is extended or adjusted under 35 U.S.C. 154(b) by 1 day.

(21) Appl. No.: 17/926,740

(22) PCT Filed: May 21, 2021

(86) PCT No.: PCT/EP2021/063683
§ 371 (c)(1),
(2) Date: Nov. 21, 2022

(87) PCT Pub. No.: WO2021/239626
PCT Pub. Date: Dec. 2, 2021

(65) Prior Publication Data

US 2023/0202700 A1 Jun. 29, 2023

(30) Foreign Application Priority Data

May 28, 2020 (IT) ........................ 102020000012679

(51) Int. Cl.
*B32B 41/00* (2006.01)
*B65C 9/04* (2006.01)
(Continued)

(52) U.S. Cl.
CPC .............. *B65C 9/1803* (2013.01); *B65C 9/04* (2013.01); *B65C 9/40* (2013.01); *B65C 2009/1838* (2013.01)

(58) Field of Classification Search
CPC ........... B65C 9/1803; B65C 9/04; B65C 9/40; B65C 2009/1838
(Continued)

(56) References Cited

U.S. PATENT DOCUMENTS

2021/0009300 A1* 1/2021 Wegge ...................... B65C 9/44

FOREIGN PATENT DOCUMENTS

EP 2091822 B1 3/2012
EP 3135594 A1 3/2017
(Continued)

OTHER PUBLICATIONS

Italy Ministry of Economic Development, Search Report and Opinion (with English translation), Italian Patent Application No. 102020000012679, 9 pages, Feb. 18, 2021.
(Continued)

*Primary Examiner* — Michael N Orlando
*Assistant Examiner* — Joshel Rivera
(74) *Attorney, Agent, or Firm* — THOMPSON HINE LLP

(57) ABSTRACT

A container labeling machine that includes a conveyance device for conveying containers to be labeled along an advancement path and at least one labeling station arranged along the advancement path of the containers, the labeling station including an unwinding assembly for a labeling ribbon wound in a spool and a cutting drum which supports at least one cutting device, the cutting device including a respective suction chamber which accommodates at least one blade; a diagnostic device for diagnosing the correct operation of the cutting device is also provided, with a detection device for detecting at least one parameter correlated with the pressure present in the suction chamber.

11 Claims, 5 Drawing Sheets

(51) Int. Cl.
*B65C 9/18* (2006.01)
*B65C 9/40* (2006.01)

(58) Field of Classification Search
USPC .................... 156/60, 64, 350, 351, 378, 379
See application file for complete search history.

(56) References Cited

FOREIGN PATENT DOCUMENTS

| | | | |
|---|---|---|---|
| WO | 2015/173091 | A1 | 11/2015 |
| WO | 2018/114618 | A1 | 6/2018 |

OTHER PUBLICATIONS

European Patent Office (ISA/EP), International Search Report and Written Opinion of the International Searching Authority, International Application No. PCT/EP2021/063683, 11 pages, Sep. 2, 2021.

* cited by examiner

CONTAINER LABELING MACHINE

TECHNICAL FIELD

The present invention relates to a container labeling machine.

BACKGROUND

As is known, container labeling machines have, generally, a conveyor for the containers to be labeled, which is typically constituted by a rotating carousel, which has, peripherally, a plurality of supports each one is designed to receive an individual container from an entry carousel and to make it rotate about its own axis.

Around the carousel, there is at least one labeling station, which has a transfer drum which rotates in step with the carousel and makes it possible to apply a respective label on the containers in transit on the carousel, the label having been previously obtained by cutting a continuous labeling ribbon, on which the labels to be applied are consecutively printed and which is taken from a spool using an unwinding assembly.

The labeling ribbon can be of the pre-glued type, i.e. it can already have, when it is still wound in a spool, a layer of preapplied adhesive on the side of the labels that is intended to come into contact with the containers, or it can lack preapplied adhesive and, in that case, on the labeling machine there is provided an assembly for applying the adhesive to the labels before they are transferred to the containers.

In particular, labeling machines are known in which a cutting drum is interposed between the unwinding assembly and the transfer drum and is designed to receive, on the lateral surface thereof, the labeling ribbon taken by the unwinding assembly and is designed to cut the individual labels, which are transferred to the transfer drum, so that they can be transferred to the containers.

Usually, the transfer drum is circumferentially divided into sectors or divisions, each one of which is designed to receive a respective label from the cutting drum.

The cutting drum can be provided with one or more blades, fixed thereto, which cut the labeling ribbon between one label and the next, in cooperation with a fixed blade which is integral with the supporting structure of the machine.

Labeling machines are also known in which the cutting drum also acts as the transfer drum.

In this case the drum is called a cutting and transfer drum, and it receives, so that it adheres thereto, by virtue of suction ports on its lateral surface, the labeling ribbon and cuts it using blades, associated therewith, in order to then transfer the individual labels, separated after cutting, to the corresponding container conveyed by the carousel.

EP2091822, in the name of this same applicant, discloses a cutting and transfer drum that is provided with a plurality of blades, which are mutually spaced apart along circumferential portions substantially equal in extension to the length of the labels, and which can be actuated to move individually via actuating cylinders, so as to cut the labeling ribbon in the separation region between the labels.

Also known is a labeling machine, disclosed in Italian patent no. 102016000128413, again in the name of this same applicant, in which there is a cutting drum, which is designed to receive on the lateral surface thereof the labeling ribbon fed by the unwinding assembly, and which is provided, around the lateral surface thereof, with a plurality of cutting devices, each one comprises a blade, which is integrally fixed to the cutting drum and is accommodated in a corresponding suction chamber, which is open at the lateral surface of the transfer drum and connected to air suction means, which make it possible to attract the labeling ribbon inward into the chamber so as to push it against the blade, thus resulting in the cutting thereof.

One problem that is found with using labeling machines is that, owing to the progressive wear of the blades of the cutting drum, over time it becomes difficult for the cutting drum to correctly cut the labeling ribbon.

For this reason, periodic checks are scheduled to verify the correct operation of the cutting drum, which are normally carried out when starting up the machine, and the blades thereof are periodically replaced.

In conventional labeling machines, the verification of the correct operation of the cutting drum is entrusted to the supervision of an operator who checks whether the labels are uniformly cut by the cutting drum during the operation of the machine, or, in any case, to a visual examination of the state of the blades, before starting the machine.

Such procedures do not make it possible to quickly identify situations that could arise in which the cutting drum is operating anomalously, when the machine is in operation.

SUMMARY

The aim of the present invention is to provide a labeling machine that is capable of improving the known art in one or more of the above mentioned aspects.

Within this aim, an object of the invention is to provide a labeling machine that makes it possible to keep the correct operation of the cutting drum constantly under control.

Another object of the invention is to provide a labeling machine that offers the possibility of identifying in real time any anomalies in the execution of the cut by the individual blades on the cutting drum.

Another object of the present invention is to provide a labeling machine that is capable of offering the widest guarantees of reliability and safety in its operation.

A further object of the present invention is to overcome the drawbacks of the background art in a manner that is alternative to any existing solutions.

Another object of the invention is to provide a labeling machine that is relatively easy to provide and which can be produced at low cost, so as to be competitive from a purely economic viewpoint as well.

This aim and these and other objects which will become better apparent hereinafter are achieved by a container labeling machine according to claim 1, optionally provided with one or more of the characteristics of the dependent claims.

BRIEF DESCRIPTION OF THE DRAWINGS

Further characteristics and advantages of the invention will become better apparent from the description of preferred, but not exclusive, embodiments of the labeling machine according to the invention, which are illustrated for the purposes of non-limiting example in the accompanying drawings wherein.

DETAILED DESCRIPTION

Figure 1:
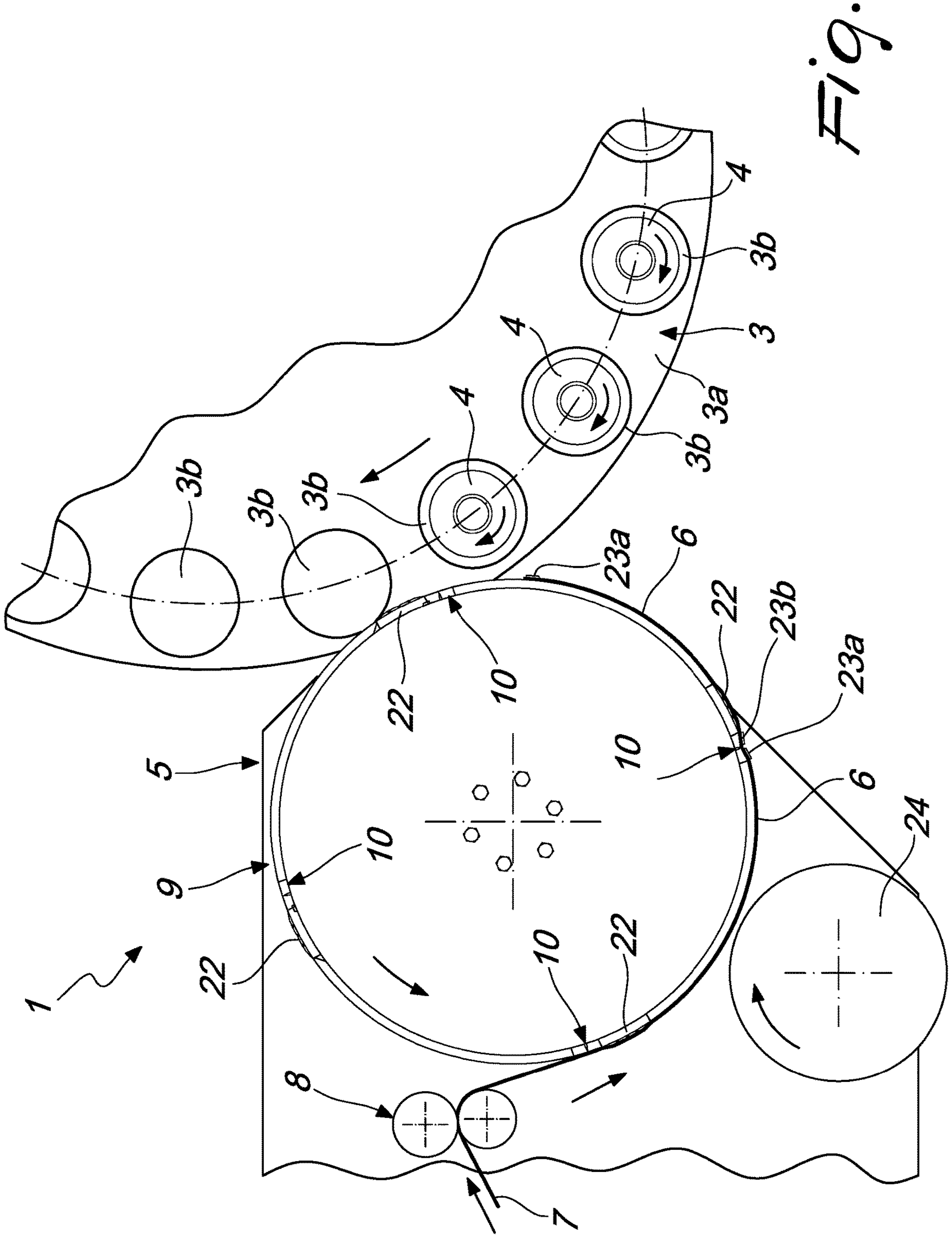
FIG. 1 is a schematic plan view from above of the machine according to the invention.

With reference to the figures, the container labeling machine according to the invention, generally designated by the reference numeral 1, comprises conveyance means 3 for conveying, along an advancement path, containers 4 to be labeled and at least one labeling station 5, which is arranged along an advancement path of the containers 4 and is designed to apply a respective label 6 onto the containers 4 which is obtained by cutting a labeling ribbon 7 wound in a spool, on which a plurality of labels 6 are printed in succession.

In particular, the conveyance means 3 are conveniently constituted by a carousel 3*a*, which is actuated in rotation about its own axis and which is peripherally provided with rotating supports 3*b*, on each one an individual container 4 is placed.

The labeling station 5 comprises, in turn, an unwinding assembly 8 of the labeling ribbon 7 and a cutting drum 9, which can move by rotation about its own axis and is designed to receive, so that it adheres to the external lateral surface thereof, the labeling ribbon 7 fed by the unwinding assembly 8, by virtue of air suction ports, not shown, which are defined on the external lateral surface thereof.

In particular, the cutting drum 9 supports at least one cutting device 10 which can be activated, using actuation means, to carry out the cut of the labels 6 to be transferred to the containers 4 that transit on the conveyance means 3.

The cutting drum 9 can, optionally, also have two or more cutting devices 10, arranged so as to be mutually angularly spaced apart, about the axis of the cutting drum 9.

The extension of the circumferential portion of the cutting drum 9 between two consecutive cutting devices 10 can be equal to at least the length of the individual labels 6.

More specifically, each cutting device 10 comprises a respective suction chamber 11, which is open at the external lateral surface of the cutting drum 9 and which accommodates, inside it, at least one blade 12.

Figure 4:
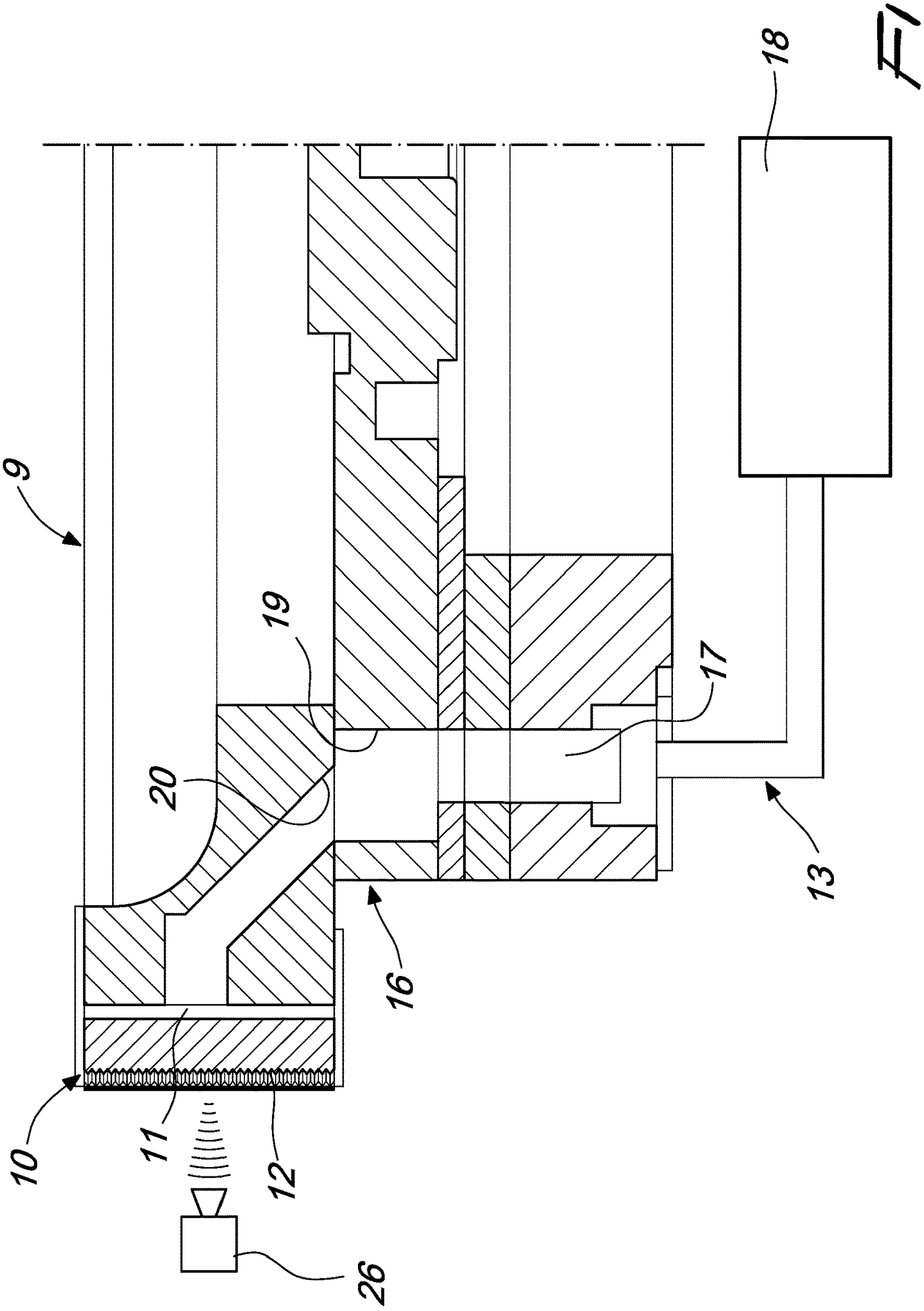
FIG. 4 is a schematic cross-sectional view, taken along a diametrical plane, of the cutting drum in a possible further embodiment of the machine according to the invention.
Figure 5:
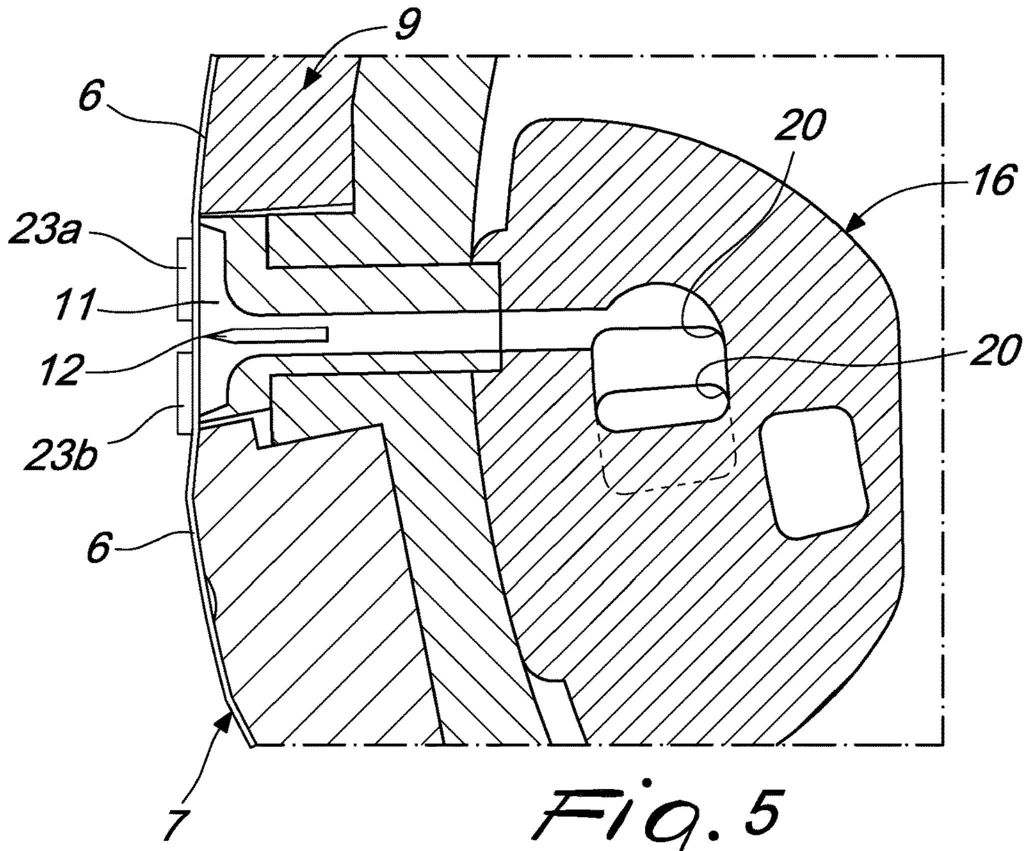
FIG. 5 is a cross-sectional view of the cutting drum, taken along a plane perpendicular to its rotation axis, in a step before cutting a labeling ribbon.
Figure 6:
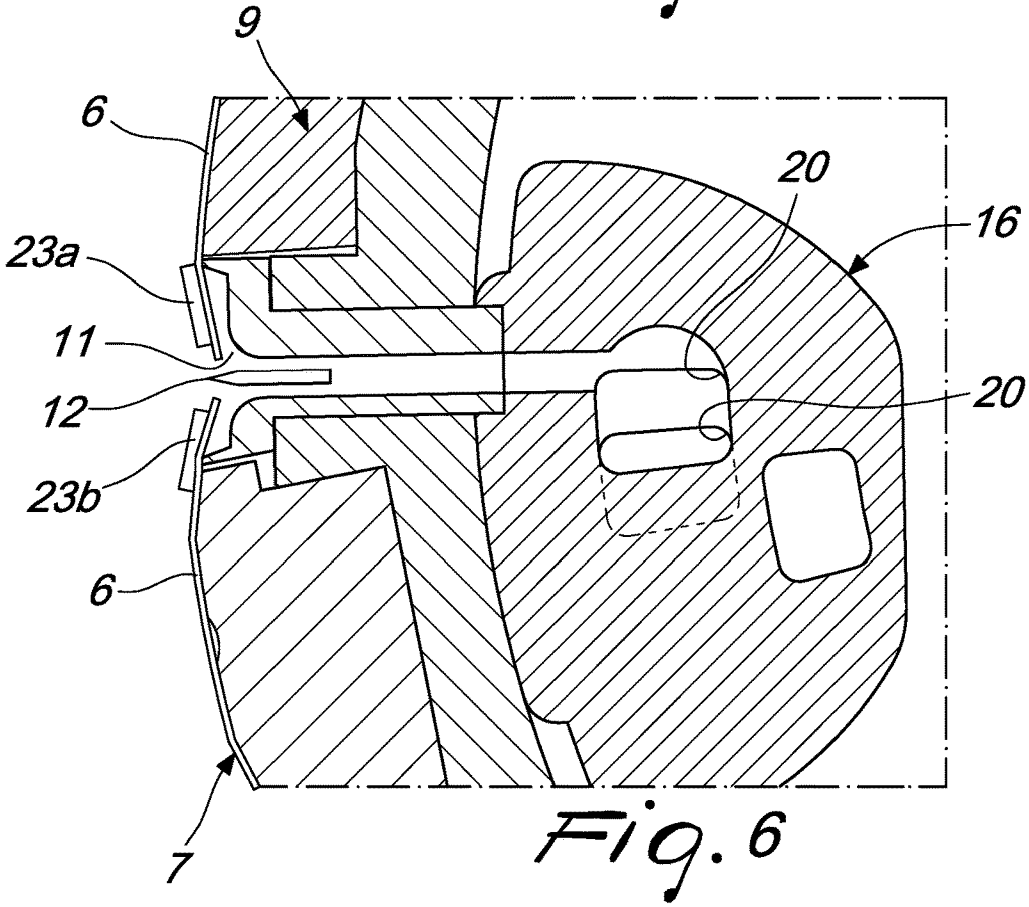
FIG. 6 is a view of the cutting drum similar to that of FIG. 5 in a step immediately after cutting the labeling ribbon.

The suction chamber 11 can be connected with air suction means 13, so as to be able to apply an attraction on the labeling ribbon 7 inward into the suction chamber 11, in order to push the labeling ribbon 7 against the blade 12 and cut it, as shown schematically in FIGS. 4 and 5.

According to the invention, the machine comprises a diagnostic device for diagnosing the correct operation of the cutting devices 10 of the cutting drum 9, which is provided with detection means for detecting at least one parameter correlated with the pressure present in the suction chamber 11 of the cutting devices 10. Advantageously, the diagnostic device comprises an electronic control unit 14, whose input is connected to the above mentioned detection means, and which is adapted to compare the value of the parameter detected by virtue of the detection means with a preset theoretical value of the same parameter.

Advantageously, the electronic control unit 14 is designed to act, minus a presettable tolerance margin, on the air suction means 13, in the presence of a difference between the value of the parameter detected by virtue of the detection means and the preset theoretical value of the parameter, in order to return the value of the detected parameter to the preset theoretical value.

In more detail, the cited detection means comprise pressure measurement means 15 which make it possible to measure the pressure present in the suction chamber 11 of the, or of each, cutting device 10, at least when the suction chamber 11 is connected with the suction means 13.

In this case, the electronic control unit 14 makes it possible to determine the trend over time of the pressure detected by the pressure measurement means 15 inside the suction chamber 11 and to compare it with an expected theoretical trend over time of the pressure inside the pressure chamber 11 under normal operating conditions of the cutting devices 10.

Also in this case, the electronic control unit 14 is further capable of acting on the suction means 13, in order to command a variation of the flow rate of air extracted by the suction means 13, following the detection, by this electronic control unit, of a difference, minus the preset tolerance margin, between the trend over time of the pressure detected by the pressure measurement means 15 and the expected theoretical trend over time of the pressure inside the suction chamber 11.

It should be noted that, if the cutting drum 9 is provided with two or more cutting devices 10, there can be, for each one of the cutting devices 10, respective pressure measurement means 15.

Also if the cutting drum 9 is provided with two or more cutting devices 10, the electronic control unit 14 will be able, for each one of the cutting devices 10, to determine the trend over time of the pressure detected by the corresponding pressure measurement means 15 inside the respective suction chamber 11 and to compare the trend over time of the pressure detected with the expected theoretical trend over time.

With reference to the embodiment shown in the figures, the suction means 13 comprise a fixed vacuum distribution unit 16 on which the cutting drum 9 is rotatably mounted and in which at least one vacuum chamber 17 is defined, which is connected to a vacuum pump 18.

The vacuum chamber 17 has a communication opening 19 defined on the face of the fixed distribution unit 16 that is directed toward the cutting drum 9.

The suction chamber 11 of the, or of each, cutting device 10 of the cutting drum 9 is, in turn, connected with a connecting opening 20, which is defined on the face of the cutting drum 9 that is directed toward the fixed distribution unit 16.

In this manner, during the rotation of the cutting drum 9 with respect to the fixed distribution unit 16, when the connecting opening 20 of each cutting device 10 passes in front of the communication opening 19 of the vacuum chamber 17, the corresponding suction chamber 11 is placed in communication with the vacuum pump 18.

As shown in the figures, according to the embodiment shown, the measurement means 15 can be constituted by at least one pressure sensor 15*a*, which is arranged inside the vacuum chamber 17 of the fixed distribution unit 16.

Optionally, it is possible for the electronic control unit 14 to also command the activation of signaling means 21, which are capable of emitting a warning signal, for example of the acoustic and/or visual type, following the detection by the electronic control unit 14, for at least one of the cutting devices 10, of a difference, minus the preset tolerance margin, between the trend over time of the pressure detected inside the corresponding suction chamber 11 by the corresponding pressure measurement means and the expected theoretical trend over time.

For the sake of completeness, it should be noted that the cutting drum 9 can be designed to directly transfer the labels 6 obtained after cutting onto a respective container 4 transported by the conveyance means 3, so as to act, in practice, as a cutting and transfer drum, as shown in FIG. 1.

In this case, each cutting device 10 can be associated with a respective skid 22, which is integral with the cutting drum 9 and is mounted protruding from the remaining part of the external lateral surface of the cutting drum 9, in order to allow the application of two strips of adhesive 23*a* and 23*b*, respectively at the tail end and at the head end of two consecutive labels 6 on the labeling ribbon 7, by an adhesive applicator roller 24, which is arranged adjacent to the cutting drum 9, before the labeling ribbon 7 is cut by the corresponding cutting device 10.

Also in this case, the skid 22 of each cutting device 10 is positioned in front of the corresponding cutting device 10 and there are means of controlling the machine that are adapted to drive the unwinding assembly 8 in order to command, after the application by the applicator roller 24 of the two strips of adhesive 23*a*, 23*b* on two consecutive labels 6 resting on one of the skids 22, a slowing of the feeding speed of the labeling ribbon 7 with respect to the peripheral speed of the cutting drum 9, in order to bring the cutting device 10 situated behind the skid 22, on which the two consecutive labels 6 were placed, to the portion of the labeling ribbon 7 interposed between the two strips of adhesive 23*a* and 23*b* on which the cut is to be made.

Figure 2:
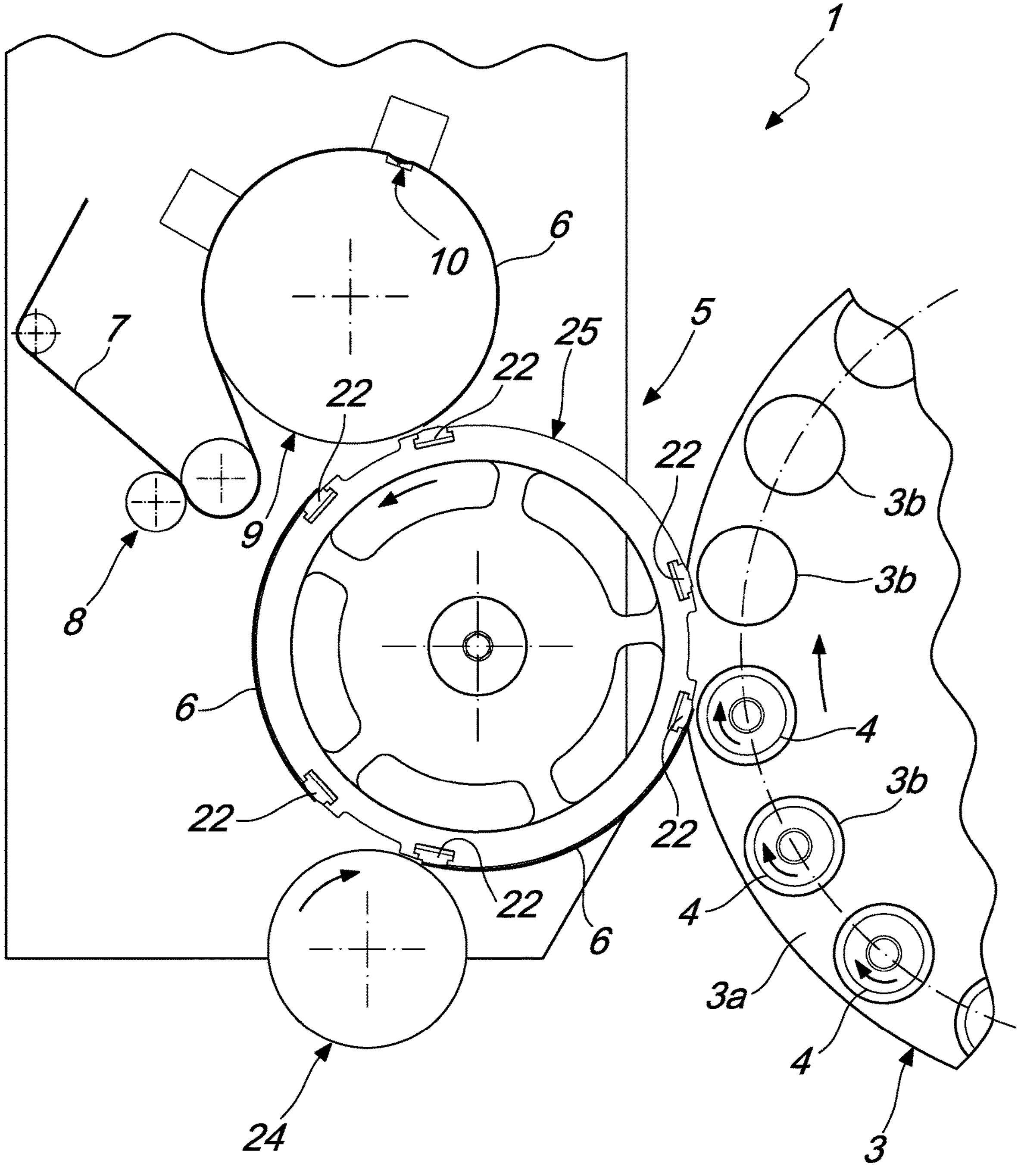
FIG. 2 is a plan view from above of a possible further embodiment of the machine according to the invention.
Figure 3:
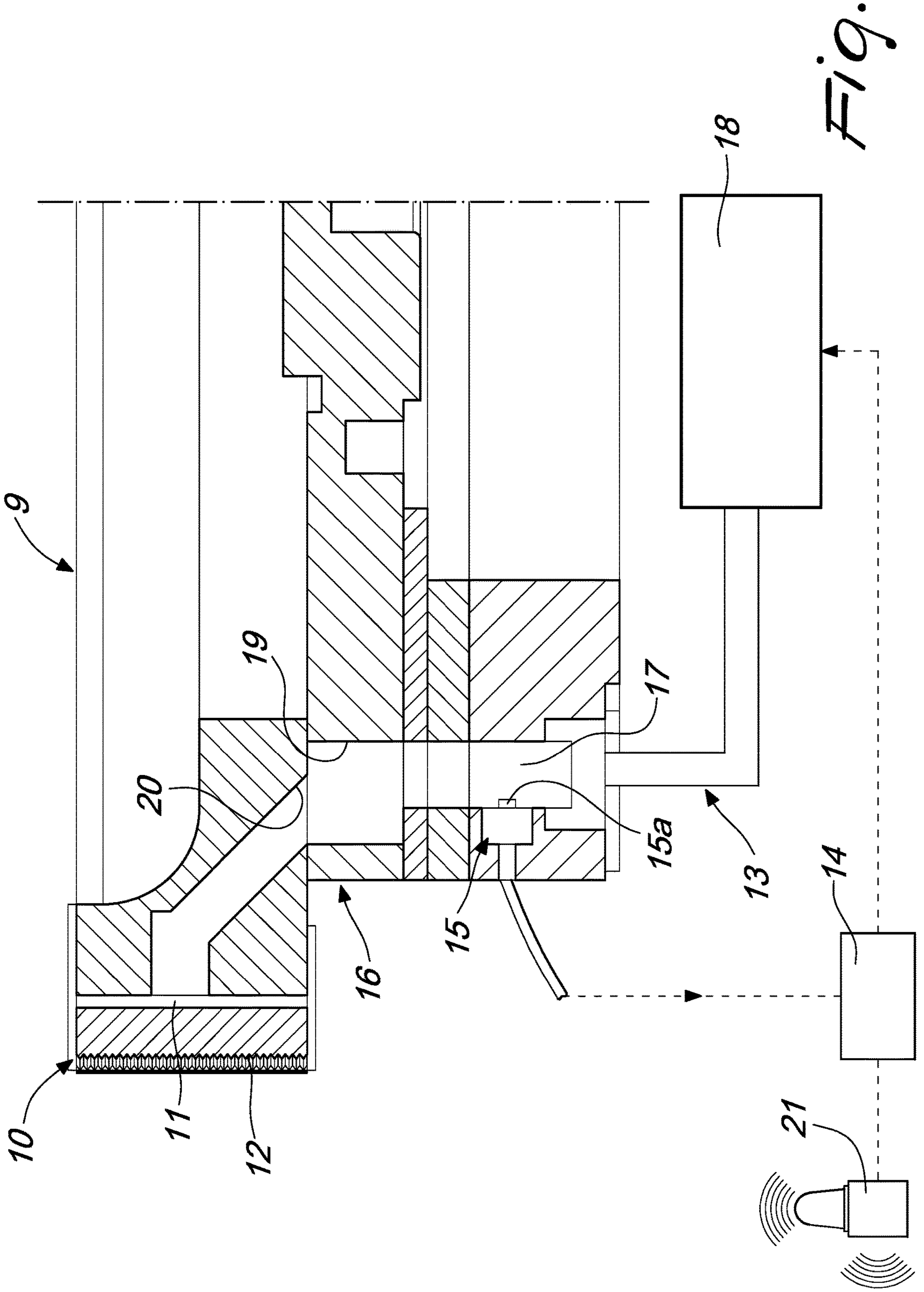
FIG. 3 is a schematic cross-sectional view, taken along a diametrical plane, of a cutting drum of the machine according to the invention.

Alternatively, as shown instead in FIG. 2, the cutting drum 9 can also transfer the labels 6 obtained after cutting to a transfer drum 25, which is adapted to bring, in succession, the labels 6 received from the cutting drum 9 into contact with a respective container 4 transported by the conveyance means 3.

In this case, the transfer drum 25 is perimetrically subdivided, as is known per se, into multiple sectors, mutually separate, which are designed in each instance to each receive a respective label 6 and which have a circumferential extension of substantially equal length to the length of the labels.

Each sector of the transfer drum 25 has, at the ends, two skids 22, which protrude outward with respect to the remaining part of the lateral surface of the transfer drum 25, in order to allow an adhesive applicator roller 24, adjacent to the transfer drum 25, to apply the adhesive to the ends of the labels 6.

The operation of the machine, according to the invention, is the following.

With reference to the embodiment of FIG. 1, in a first step, the labeling ribbon 7 is fed by the unwinding assembly 8 to the cutting drum 9 at a first feeding speed, substantially equal to the peripheral speed of the cutting drum 9, and is kept adhered on the lateral surface of the cutting drum 9 with the head and tail ends of two consecutive labels 6 resting on one of the skids 22.

When the skid 22 on which the head and tail ends of the two consecutive labels 6 are resting passes in front of the applicator roller 24, the latter applies the strips of adhesive 23*a* and 23*b* on the head and tail ends of the two labels 6 respectively.

In a second step, the control means of the machine command the unwinding assembly 8 to feed the labeling ribbon 7 to the cutting drum 9 at a second feeding speed, lower than the first feeding speed, so that the cutting device 10 arranged behind the skid that, in the first step, passed in front of the applicator roller 24, is brought, following a slipping of the cutting drum 9 on the labeling ribbon 7, to the portion of the labeling ribbon 7 interposed between the two strips of adhesive 23*a* and 23*b* applied by the applicator roller 24.

In a third step, the control means of the machine command the unwinding assembly 8 to again feed the labeling ribbon 7 with the first feeding speed so that the cutting device 10 and the portion of the labeling ribbon 7 interposed between the strips of adhesive 23*a*, 23*b* move in synchronization with each other.

In a fourth step, the cutting device 10 arranged at the portion of the labeling ribbon 7 interposed between the two strips of adhesive 23*a* and 23*b* reaches the angular position in which the connecting opening 20 of the corresponding suction chamber 11 is in front of the communication opening 19 of the vacuum chamber 17 of the vacuum distributor 16, so as to establish a connection between the corresponding suction chamber 11 and the suction means 13, and the portion of the labeling ribbon 7 interposed between the two strips of adhesive 23*a*, 23*b* is, therefore, sucked inward into the suction chamber 11 and brought against the blade 12 which cuts it.

After the labeling ribbon 7 has been cut, the control means of the machine command the unwinding assembly 8 to feed the labeling ribbon 7 to the cutting drum 9 at the second feeding speed, so as to move the cut label 6 away from the rest of the labeling ribbon 7 and obtain, at the same time, the positioning of the next skid 22 between the next two consecutive labels 6 of the labeling ribbon 7.

As soon as the next skid 22 has been positioned between the next two consecutive labels 6 of the labeling ribbon 7, the control means command the unwinding assembly 8 to feed the labeling ribbon 7 to the cutting drum 9 at the first feeding speed, so that, while the cutting drum 9, continuing its rotation about its axis, brings the cut label 6 to the corresponding container 4 transported by the conveyance means 3, the portion of the labeling ribbon 7 resting on the skid 22 can arrive at the applicator roller 24, so that the operating cycle of the machine can resume.

With reference to the embodiment of FIG. 2, the unwinding assembly 8 feeds the labeling ribbon 7 to the cutting drum 9 at a speed synchronized with the peripheral speed of the cutting drum 9, so that the cutting drum 9 can receive the labeling ribbon 7, keeping it adhered on the lateral surface thereof, with the portion of the labeling ribbon 7 interposed between two consecutive labels 6 positioned at a cutting device 10 of the cutting drum 9.

When such cutting device 10 reaches the angular position in which the connecting opening 20 of the suction chamber 11 thereof is in front of the communication opening 19 of the vacuum chamber 17 of the vacuum distributor 16, the suction chamber 11 of the cutting device 10 is placed in connection with the suction means 13, so that the portion of the labeling ribbon 7 interposed between the two consecutive labels 6 is attracted into the chamber inside the suction chamber 11 and brought against the blade 12 which cuts it.

The label 6 thus cut by the labeling ribbon 7 is then transferred from the cutting drum 9 to the transfer drum 25, which receives it at a corresponding sector, with the head and tail ends of the label 6 resting on the corresponding skids 22.

Continuing in its rotation, the transfer drum 25 then brings the label 6 in front of the applicator roller 24, which applies respective strips of adhesive on the head and tail ends of the label 6, and subsequently to the conveyance means 3 so that the label can be transferred to the corresponding container 4.

During the operating cycle of the machine in its various different embodiments, the diagnostic device analyzes the pressure trend in the suction chamber 11 of each cutting device 10, at least every time the corresponding connecting opening 20 is in front of the communication opening 19 of the fixed distribution unit 16, in order to detect any anomalies in operation.

In particular, every time that the connecting opening 20 of the suction chamber 11 of each cutting device 10 is in front of the communication opening 19 of the vacuum chamber 17, the pressure sensor 15*a* sends its signal to the electronic control unit 14, which calculates the trend over time of the pressure detected by the pressure sensor 15*a* and compares it with the expected theoretical trend of the pressure.

The detection of the pressure by the pressure sensor 15*a* and the sending of the detected value to the electronic control unit 14 can, optionally, also happen when the connecting opening 20 of the suction chamber 11 of the individual cutting devices 10 is not in front of the communication opening 19 of the vacuum chamber 17.

By virtue of the comparison carried out by the electronic control unit 14 of the trend over time of the pressure detected by the pressure sensor 15*a* with the expected theoretical trend thereof, the diagnostic device can identify the presence of anomalies in the operation of the machine, such as, for example, leaks in the vacuum seal between the fixed distribution unit 16 and the cutting drum 9, the loss of seal between the parts of the cutting devices 10, the misalignment of the labeling ribbon 7 with the suction chambers 11 of the cutting devices 10 before carrying out the cut, with resulting loss of the vacuum seal between the labeling ribbon 7 and the suction chamber 11, the reduction of the cutting efficiency of the blade 12.

In particular, if a difference is found by the electronic control unit 14, minus the preset tolerance margin, between the trend over time of the pressure detected by the pressure sensor 15*a* and the expected theoretical trend of that pressure in the suction chamber 11, then the electronic control unit 14 can act on the suction means 13 and, more specifically, on the vacuum pump 18, so as to cancel out or at least reduce such difference, so as to ensure good operating conditions of the machine.

Again following the detection by the electronic control unit 14 of a difference, minus the preset tolerance margin, between the trend over time of the pressure detected by the pressure sensor 15*a* and the expected theoretical trend of that pressure in the suction chamber 11, for at least one of the cutting devices 10, the electronic control unit 14 can activate the signaling means 21, so as to enable the user to immediately identify the cutting device 10 that has an anomaly in its operation and to quickly intervene to restore its correct operating conditions.

It is possible for the diagnostic device to be activated automatically in the first operating cycles of the machine, so as to conduct an automatic diagnostic step each time the machine is started.

In practice it has been found that the invention fully achieves the intended aim and objects and in particular attention is drawn to the fact that, for the machine according to the invention, by virtue of its diagnostic device, it is possible to identify any differences in operation between the cutting devices of the cutting drum, easily identify any cutting device with a worn blade, with the consequent possibility of quickly organizing its replacement, or make a dynamic correction of the level of vacuum in the suction chambers of the cutting devices, thus enabling the machine to work at maximum capacity with the minimum consumption of vacuum.

The invention, thus conceived, is susceptible of numerous modifications and variations, all of which are within the scope of the appended claims.

Thus, for example, as shown in FIG. 4, the detection means can optionally also take the form of at least one acoustic sensor 26 adapted to detect the sound emitted at the suction chamber 11 of the, or of each, cutting device 10 and, in this case, the control unit 14 will be adapted to compare the sound detected by the acoustic sensor 26 with the sound expected under conditions of normal and correct operation of the, or of each, cutting device 10.

There is no reason why the detection means cannot be constituted by knock sensors or detonation sensors or, more generally, by a vibratory element, which is susceptible of vibrating in the presence of a pressure wave or of a pressure variation, and by a transducer connected functionally to this vibratory element and adapted to produce a signal in response to the vibration induced on this vibratory element.

Moreover, all the details may be substituted by other, technically equivalent elements.

In practice, the materials used, as well as the contingent shapes and dimensions, may be any according to the requirements and to the state of the art.

The disclosures in Italian Patent Application No. 102020000012679 from which this application claims priority are incorporated herein by reference.

The invention claimed is:

1. A container labeling machine comprising conveyance means for conveying containers to be labeled along an advancement path and at least one labeling station arranged along said advancement path of the containers, said labeling station comprising an unwinding assembly for a labeling ribbon wound in a spool and a cutting drum, which is designed to receive, so that it adheres to the external lateral surface thereof, said labeling ribbon fed by said unwinding assembly and which supports at least one cutting device which can be activated, by virtue of actuation means, in order to cut labels to be transferred to said containers, said at least one cutting device comprising a respective suction chamber, which is open at an external lateral surface of said cutting drum and accommodates at least one blade, said suction chamber being connectable with air suction means in order to apply to said labeling ribbon an action of attraction toward the inside of said suction chamber and push said labeling ribbon against said blade, in order to result in said labeling ribbon being cut, and further comprising a diagnostic device for diagnosing a correct operation of said at least one cutting device, said diagnostic device being provided with detection means for detecting at least one parameter correlated with pressure present in said suction chamber.

2. The machine according to claim 1, wherein said diagnostic device comprises an electronic control unit which is connected to said detection means and is adapted to compare a value of said at least one parameter detected by virtue of said detection means with a preset theoretical value of said at least one parameter.

3. The machine according to claim 2, wherein said electronic control unit is adapted to act, minus a presettable tolerance margin, on said air suction means, in the presence of a difference between the value of said at least one parameter detected by virtue of said detection means and said preset theoretical value of said at least one parameter, in order to return said value of said at least one detected parameter to said preset theoretical value.

4. The machine according to claim 3, wherein said detection means comprise pressure measurement means which are adapted to measure the pressure in said suction chamber, at least with said suction chamber connected with said suction means, said electronic control unit being adapted to determine a trend over time of the pressure detected by said measurement means inside said suction chamber and to compare it with an expected theoretical trend over time of the pressure inside said suction chamber in conditions of normal operation of said cutting device, said electronic control unit being adapted to command a variation of a flow rate of air extracted by said suction means, following the detection, by said electronic control unit, of a difference, minus said presettable tolerance margin, between the trend over time of the pressure detected by the pressure measurement means and the expected theoretical trend over time of the pressure inside said suction chamber.

5. The machine according to claim 4, wherein said cutting drum is provided with at least two cutting devices which are arranged mutually angularly spaced apart around an axis of said cutting drum, said electronic control unit being adapted to determine, for each one of said cutting devices, the trend over time of the pressure detected by said measurement means inside the respective suction chamber and to compare it with said expected theoretical trend over time.

6. The machine according to claim 4, wherein said electronic control unit is adapted to command an activation of signaling means adapted to emit a warning signal, following the detection by said electronic control unit, for at least one of said cutting devices, of a difference, minus said tolerance margin, between the trend over time of the pressure detected inside the corresponding suction chamber by the corresponding pressure measurement means and said expected theoretical trend over time.

7. The machine according to claim 3, wherein said pressure measurement means comprise at least one pressure sensor.

8. The machine according to claim 1, wherein said suction means comprise a fixed vacuum distribution unit, on which said cutting drum is rotatably mounted, at least one vacuum chamber being defined in said fixed distribution unit, being connected to a vacuum pump and having a communication opening located on a face of said fixed distribution unit that is directed toward said cutting drum, said suction chamber being connected with a connecting opening defined on a face of said cutting drum that is directed toward said fixed distribution unit, said pressure sensor being arranged at said vacuum chamber.

9. The machine according to claim 1, wherein said detection means comprise at least one acoustic sensor adapted to detect a sound emitted at said suction chamber.

10. The machine according to claim 1, wherein said cutting drum is adapted to transfer the labels obtained after cutting onto a respective container which is transported by said conveyance means.

11. The machine according to claim 1, wherein said cutting drum is adapted to release the labels obtained after cutting to a transfer drum which is adapted to bring the labels received from said cutting drum into contact with a respective container transported by said conveyance means.

* * * * *